(12) United States Patent
Murray

(10) Patent No.: US 8,224,726 B2
(45) Date of Patent: Jul. 17, 2012

(54) USER INTERFACE FOR TAX-RETURN PREPARATION

(75) Inventor: David K. Murray, Carlsbad, CA (US)

(73) Assignee: TaxNet Inc., Oceanside, CA (US)

( * ) Notice: Subject to any disclaimer, the term of this patent is extended or adjusted under 35 U.S.C. 154(b) by 0 days.

(21) Appl. No.: 11/334,033

(22) Filed: Jan. 17, 2006

(65) Prior Publication Data
US 2007/0033116 A1    Feb. 8, 2007

Related U.S. Application Data

(60) Provisional application No. 60/644,328, filed on Jan. 14, 2005.

(51) Int. Cl.
*G06Q 40/00* (2012.01)
(52) U.S. Cl. .............. 705/35; 705/4; 705/19; 705/26; 705/30; 705/31; 705/36 R; 705/37; 705/39; 705/40; 705/42; 707/1; 709/206; 715/708; 715/804
(58) Field of Classification Search .............. 705/19, 705/26, 30, 31, 35–45; 707/1; 715/804
See application file for complete search history.

(56) References Cited

U.S. PATENT DOCUMENTS

| | | | |
|---|---|---|---|
| 5,715,415 A * | 2/1998 | Dazey et al. | 715/708 |
| 6,697,787 B1 * | 2/2004 | Miller | 705/31 |
| 6,925,609 B1 * | 8/2005 | Lucke | 715/804 |
| 7,076,458 B2 * | 7/2006 | Lawlor et al. | 705/35 |
| 7,165,044 B1 * | 1/2007 | Chaffee | 705/37 |
| 7,219,072 B1 * | 5/2007 | Sundaresan | 705/26.42 |
| 7,401,040 B2 * | 7/2008 | Sloan et al. | 705/36 R |
| 2001/0029475 A1 * | 10/2001 | Boicourt et al. | 705/30 |
| 2001/0032244 A1 * | 10/2001 | Neustel | 709/206 |
| 2001/0037268 A1 * | 11/2001 | Miller | 705/31 |
| 2002/0013747 A1 | 1/2002 | Valentine et al. | |
| 2002/0038289 A1 * | 3/2002 | Lawlor et al. | 705/42 |
| 2002/0091602 A1 * | 7/2002 | Stern et al. | 705/35 |
| 2002/0111888 A1 * | 8/2002 | Stanley et al. | 705/31 |

(Continued)

FOREIGN PATENT DOCUMENTS
WO    WO 03/044702    * 5/2003

OTHER PUBLICATIONS
Zarowin et al. Tax software Buyers' Guide. Journal of Accountancy, vol. 182, 1996.*

*Primary Examiner* — Narayanswamy Subramanian
*Assistant Examiner* — Robert Niquette
(74) *Attorney, Agent, or Firm* — Hovey Williams LLP

(57) ABSTRACT

A method is implementable in an electronic system coupled to an electronic device, which is, in turn, coupled to a display device. A web page displayable on the display device is served to the electronic device. The displayed web page includes a user interface, which, in turn, includes a frame and at least one stile defining a plurality of panes within the frame. In a first one of the panes, at least one field into which a tax-data provider can input tax data is displayed. In a second one of the panes, information of a first type of a plurality of information types operable to assist the provider in performing a first operation of a set of operations using the user interface is displayed. Input tax data is received from the electronic device.

21 Claims, 7 Drawing Sheets

U.S. PATENT DOCUMENTS

| | | | |
|---|---|---|---|
| 2002/0133410 A1* | 9/2002 | Hermreck et al. | 705/19 |
| 2003/0061131 A1 | 3/2003 | Parkan, Jr. | |
| 2003/0187768 A1* | 10/2003 | Ryan et al. | 705/35 |
| 2003/0188260 A1 | 10/2003 | Jensen et al. | |
| 2003/0233259 A1* | 12/2003 | Mistretta et al. | 705/4 |
| 2004/0215564 A1* | 10/2004 | Lawlor et al. | 705/40 |
| 2005/0038722 A1* | 2/2005 | Throndson et al. | 705/31 |
| 2005/0125335 A1* | 6/2005 | Bross et al. | 705/39 |
| 2005/0203815 A1* | 9/2005 | Abts et al. | 705/30 |
| 2007/0033116 A1* | 2/2007 | Murray | 705/31 |
| 2007/0174228 A1* | 7/2007 | Folting et al. | 707/1 |

* cited by examiner

USER INTERFACE FOR TAX-RETURN PREPARATION

PRIORITY CLAIM

The present application claims priority from U.S. Provisional Application No. 60/644,328 filed Jan. 14, 2005, which is, along with commonly owned and co-pending U.S. patent application Ser. No. 11/334,730 entitled "USER INTERFACE AND DATA ACQUISITION FOR TAX-RETURN PREPARATION," and commonly owned and co-pending U.S. patent application Ser. No. 11/334,032 entitled "DISTRIBUTED TAX-RETURN-PREPARATION PROCESSING," herein incorporated by reference.

FIELD OF THE INVENTION

This invention relates generally to graphical user interfaces and, more specifically, to a user interface enabling a user to prepare a tax return.

BACKGROUND OF THE INVENTION

Many of those who prepare tax returns are familiar with the myriad tax-return-preparation-software products currently available. Typically, these products enable a user to prepare a tax return by leading the user through a series of interview questions that solicit information necessary to prepare the return. Many of these questions are infamous for their tendency to cause the return preparer to be confused about the type and/or amount of data needed to answer the question. While these tax-return products often do provide links to information that can clear up the preparer's confusion, these links invariably require the preparer to transition away from display of the interview question to display of one or more pages of the desired information. Consequently, the preparer may find it difficult or otherwise inconvenient to navigate back to the interview question once the desired information is obtained.

SUMMARY OF THE INVENTION

In an embodiment of the invention, a method is implementable in an electronic system coupled to an electronic device, which is, in turn, coupled to a display device. A web page displayable on the display device is served to the electronic device. The displayed web page includes a user interface, which, in turn, includes a frame and at least one stile defining a plurality of panes within the frame. In a first one of the panes, at least one field into which a tax-data provider can input tax data is displayed. In a second one of the panes, information of a first type of a plurality of information types operable to assist the provider in performing a first operation of a set of operations using the user interface is displayed. Input tax data is received from the electronic device.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
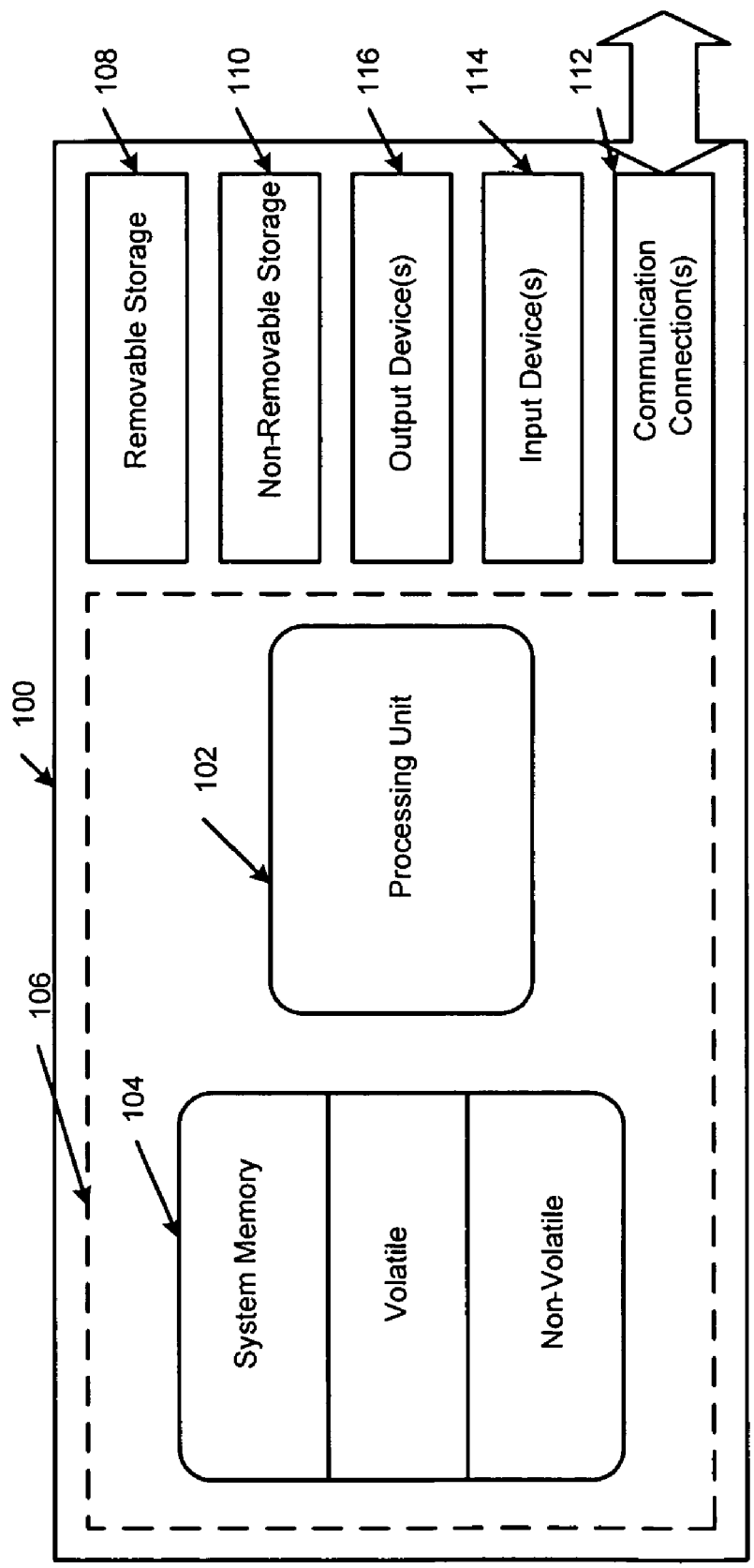
FIG. 1 is a schematic view of an exemplary operating environment in which an embodiment of the invention can be implemented.

FIG. 1 illustrates an example of a suitable computing system environment 100 on which an embodiment of the invention may be implemented. The computing system environment 100 is only one example of a suitable computing environment and is not intended to suggest any limitation as to the scope of use or functionality of embodiments of the invention. Neither should the computing environment 100 be interpreted as having any dependency or requirement relating to any one or combination of components illustrated in the exemplary operating environment 100.

Embodiments of the invention are operational with numerous other general-purpose or special-purpose computing-system environments or configurations. Examples of well-known computing systems, environments, and/or configurations that may be suitable for use with embodiments of the invention include, but are not limited to, personal computers, server computers, hand-held or laptop devices, multiprocessor systems, microprocessor-based systems, set-top boxes, programmable consumer electronics, network PCs, minicomputers, mainframe computers, distributed-computing environments that include any of the above systems or devices, and the like.

Embodiments of the invention may be described in the general context of computer-executable instructions, such as program modules, being executed by a computer. Generally, program modules include routines, programs, objects, components, data structures, etc. that perform particular tasks or implement particular abstract data types. Embodiments of the invention may also be practiced in distributed-computing environments where tasks are performed by remote processing devices that are linked through a communications network. In a distributed-computing environment, program modules may be located in both local- and remote-computer storage media including memory storage devices.

With reference to FIG. 1, an exemplary system for implementing an embodiment of the invention includes a computing device, such as computing device 100. In its most basic configuration, computing device 100 typically includes at least one processing unit 102 and memory 104.

Depending on the exact configuration and type of computing device, memory 104 may be volatile (such as random-access memory (RAM)), non-volatile (such as read-only memory (ROM), flash memory, etc.) or some combination of the two. This most basic configuration is illustrated in FIG. 1 by dashed line 106.

Additionally, device 100 may have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer-readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

Device 100 may also contain communications connection(s) 112 that allow the device to communicate with other devices. Communications connection(s) 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio-frequency (RF), infrared and other wireless media. The term computer-readable media as used herein includes both storage media and communication media.

Device 100 may also have input device(s) 114 such as keyboard, mouse, pen, voice-input device, touch-input device, etc. Output device(s) 116 such as a display, speakers, printer, etc. may also be included.

Figure 2:
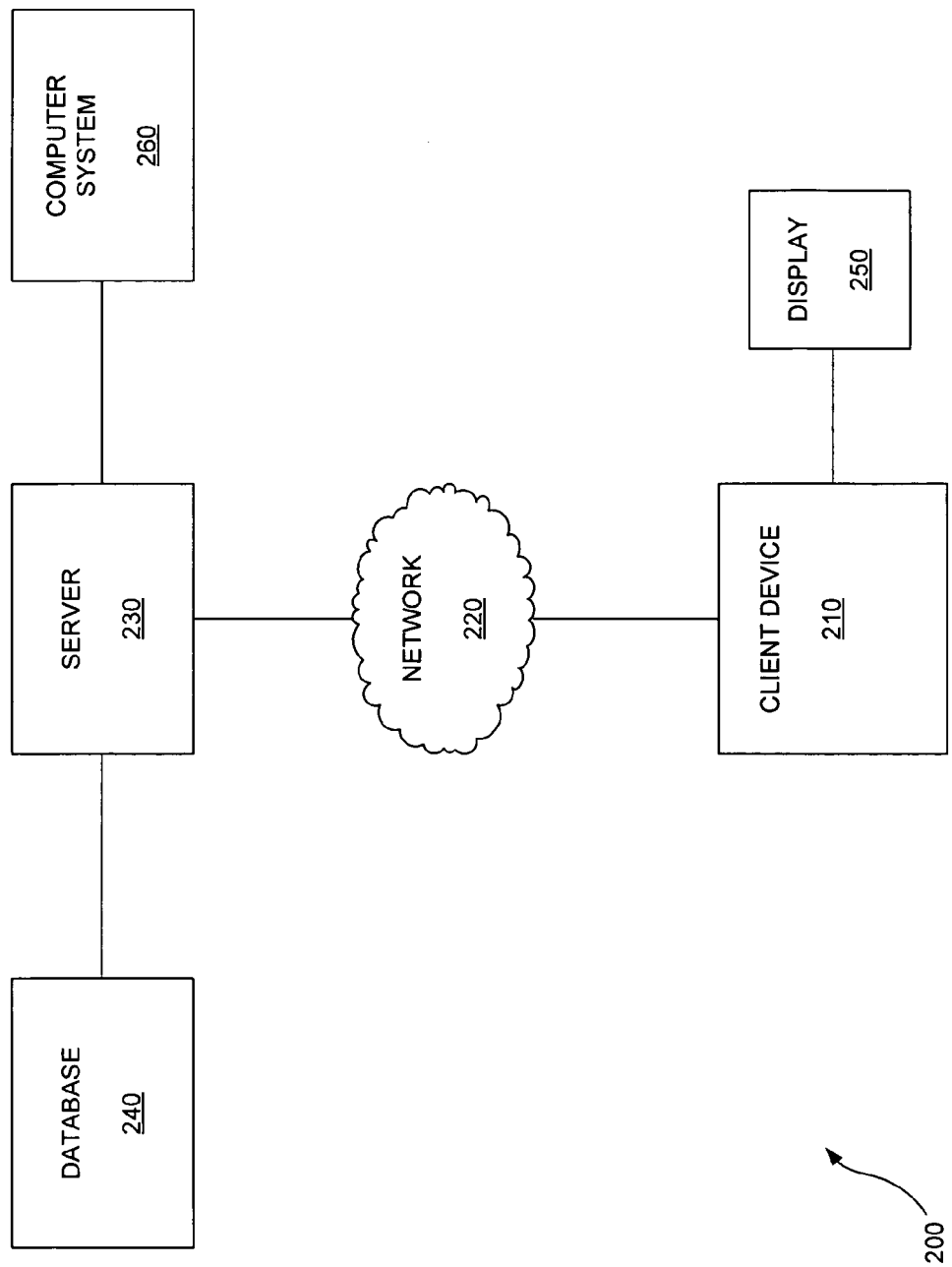
FIG. 2 is a functional block diagram of an exemplary operating environment in which an embodiment of the invention can be implemented.

Referring now to FIG. 2, an embodiment of the present invention can be described in the context of an exemplary computer network system 200 as illustrated. System 200 includes an electronic client device 210, such as a personal computer or workstation, that is linked via a communication medium, such as a network 220 (e.g., the Internet), to an electronic device or system, such as a server 230. The server 230 may further be coupled, or otherwise have access, to a database 240 and a computer system 260. Although the embodiment illustrated in FIG. 2 includes one server 230 coupled to one client device 210 via the network 220, it should be recognized that embodiments of the invention may be implemented using one or more such client devices coupled to one or more such servers.

In an embodiment, each of the client device 210 and server 230 may include all or fewer than all of the features associated with the device 100 illustrated in and discussed with reference to FIG. 1. Client device 210 includes or is otherwise coupled to a computer screen or display 250. Client device 210 can be used for various purposes including both network- and local-computing processes.

The client device 210 is linked via the network 220 to server 230 so that computer programs, such as, for example, a browser, running on the client device 210 can cooperate in two-way communication with server 230. Server 230 may be coupled to database 240 to retrieve information therefrom and to store information thereto. Database 240 may include a plurality of different tables (not shown) that can be used by server 230 to enable performance of various aspects of embodiments of the invention. Additionally, the server 230 may be coupled to the computer system 260 in a manner allowing the server to delegate certain processing functions to the computer system.

Still referring to FIG. 2, and in operation according to an embodiment of the invention, a user (not shown) of the client device 210 desiring to electronically prepare a tax return uses a browser application running on the client device to access web content served by the server 230. Specifically, and referring to FIG. 3, by employing an appropriate uniform resource locator (URL) in a known manner, the user may request a web page 300 to be displayed on the display device 250. As is discussed in further detail below, the web page 300 provides a graphical user interface that allows the user to input data from which a tax return may be prepared.

Figure 3:
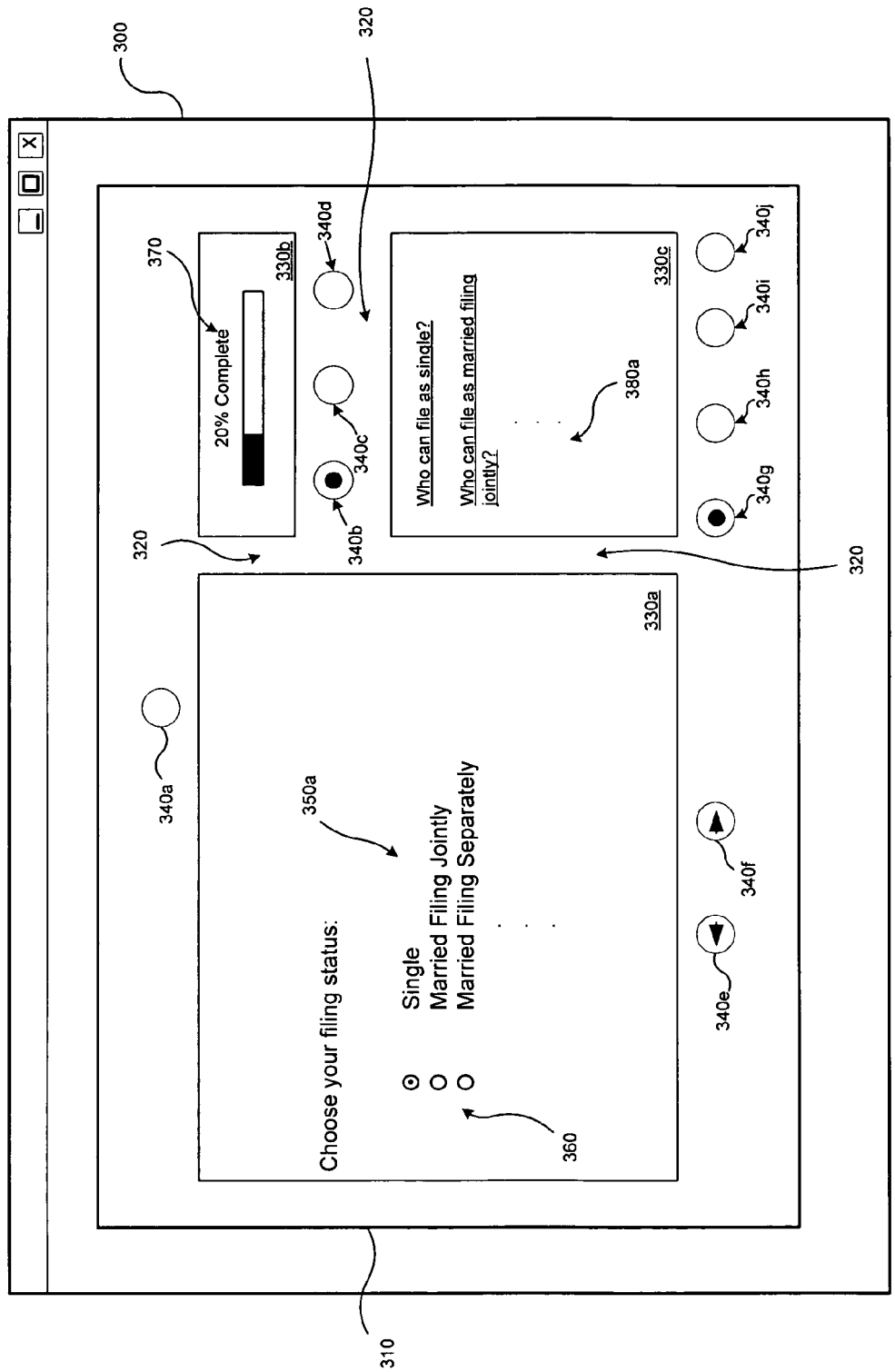
FIG. 3 is a first schematic view of a graphical user interface (GUI) according to an embodiment of the invention.

In an embodiment, and still referring to FIG. 3, the displayed web page 300 includes a frame 310 and a plurality of stiles 320 arranged to define a plurality of panes 330a-330c within which information can be displayed and/or entered. A plurality of selectable items, such as buttons 340a-340j, is disposed within (as illustrated) or outside of the frame 310. As is discussed in further detail below, selection of one or more of the buttons 340a-340j enables the user to select the type of information that the user desires to be displayed in the panes 330a-330c and/or access other information useful in preparing a tax return. For example, by selecting button 340a, the user may access and view one or more tax forms, such as those produced by the Internal Revenue Service (IRS), that may be stored in the database 240 or otherwise accessible to the server 230.

In an embodiment, one or more questions (or requests for information) 350 of a series of interview questions, which may be divided into sections corresponding to question topics, is presented to the user in pane 330a. For example, the questions may ask the user (i.e., tax-data provider) to perform operations such as providing his/her name and address, filing status, number of dependents, amount of interest income, or any other information typically necessary to complete a tax return. Accordingly, one or more fields into which the user can provide the requested information may be displayed within the pane 330a. The fields may consist of one or more radio buttons 360, alphanumeric-data-entry fields 410 (FIG. 4) and/or other appropriate data-entry fields known in the art. In an embodiment, after answering a predetermined set of questions consisting of all or fewer than all of the interview questions in the series, the user can request that the server finalize and electronically file with the appropriate revenue agency (e.g., the IRS) a tax return reflecting the user's answers to the question set.

Figure 4:
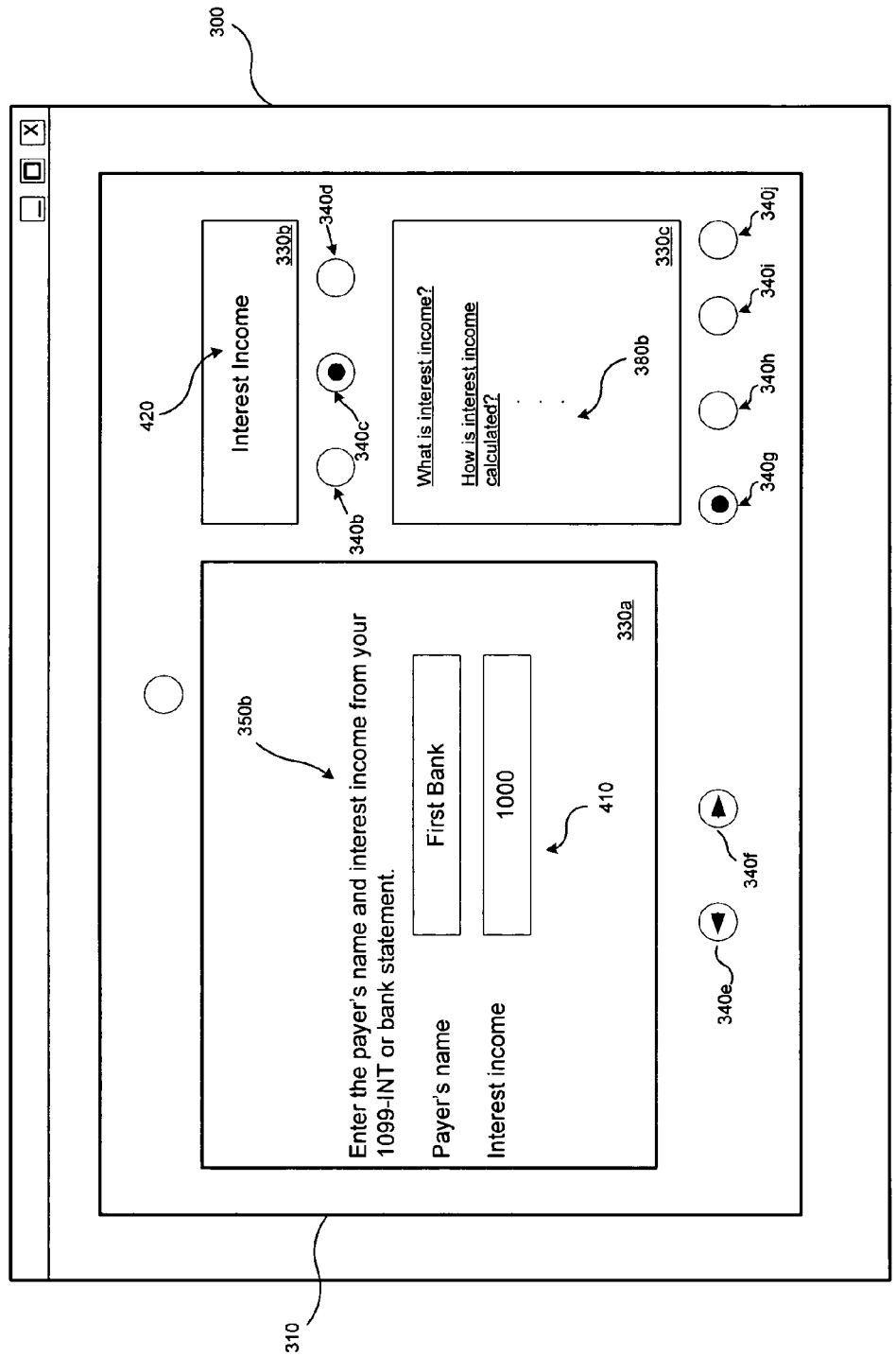
FIG. 4 is a second schematic view of the GUI according to an embodiment of the invention.

By selecting one or more of the buttons 340e, 340f, the user may navigate from one section in the series of interview questions to a different section in the series of interview questions. For example, after answering the question 350a in pane 330a pertaining to filing status (FIG. 3), the user may select the "forward" button 340f one or more times to transition to display in pane 330a of question 350b pertaining to interest income (FIG. 4). Subsequently, the user may transition back to display of question 350a in pane 330a by selecting the "back" button 340e one or more times.

Still referring to FIGS. 3 and 4, the panes 330b and 330c are configured to display multiple types of information to assist the user in performing operations including, but not limited to, inputting tax data into pane 330a, retrieving information that will better inform the user's inputting of tax data, and/or evaluating the status of the user's navigation of the series of interview questions. For example, as shown in FIG. 3, a status indicator 370 including a textual description and graphical status bar may be displayed in pane 330b to inform the user of his or her progress in completing the set of interview questions. Display of the status indicator 370 may be prompted by the user's selection of button 340b, for example. In the example illustrated in FIG. 3, the status indicator 370 informs the user that he or she has completed twenty percent of the questions to be answered. Alternatively, the status indicator 370 may inform the user of the quantity of questions remaining rather than completed. While in this mode (i.e., while button 340b is selected), the pane 330b will display the status indicator 370 updated in a manner corresponding to the progress the user makes in completing the interview-question sections displayed in pane 330a.

In an embodiment, and as illustrated in FIG. 4, the user may elect to display in the pane 330b a textual description 420 of the interview question(s) (i.e., type of tax data to be input by the user) posed to the user in the pane 330a. Display of the textual description 420 may be prompted by the user's selection of button 340c, for example. In the example illustrated in FIG. 4, the description 420 informs the user that he or she is currently working on the "Interest Income" section of the interview-question series. While in this mode (i.e., while button 340c is selected), the pane 330b will display the textual description 420 updated in a manner corresponding to the interview-question section displayed in pane 330a.

Figure 5:
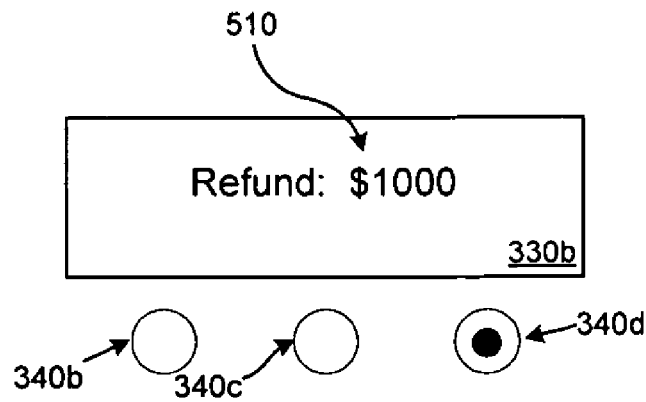
FIG. 5 is a schematic view of a first portion of the GUI according to an embodiment of the invention.

In an embodiment, and as illustrated in FIG. 5, the user may elect to display in the pane 330b a textual description 510 of the tax-refund amount due the user based on the answers that the user provides to the question series. Display of the textual description 510 may be prompted by the user's selection of button 340d, for example. In the example illustrated in FIG. 5, the description 510 informs the user that, based on the tax data thus far provided, he or she is currently owed a refund of $1000. While in this mode (i.e., while button 340d is selected), the pane 330b will display the textual description 510 updated in a manner corresponding to the refund amount owed the user.

In an embodiment, and referring back to FIG. 3, the user may elect to display in the pane 330c one or more selectable frequently asked questions (FAQs) 380 pertaining to the type of information solicited by the question displayed in pane 330a. In an embodiment, the FAQs 380 take the form of a hyperlink to information stored in the database 240 and/or other information source accessible to the server 230. Consequently, upon selection of an FAQ by the user, corresponding information (not shown) may be displayed in one or more of the panes 330a-330c. Alternatively, the corresponding information may be displayed in a web page (not shown) provided to the client device 210 by the server 230. Display of the FAQs 380 may be prompted by the user's selection of button 340g, for example. In the example illustrated in FIG. 3, the FAQs 380a consist of questions pertaining to the filing-status question displayed in pane 330a. While in this mode (i.e., while button 340g is selected), and as illustrated in FIG. 4, the pane 330c will display the FAQs 380 updated in a manner corresponding to the interview-question section displayed in pane 330a.

Figure 6:
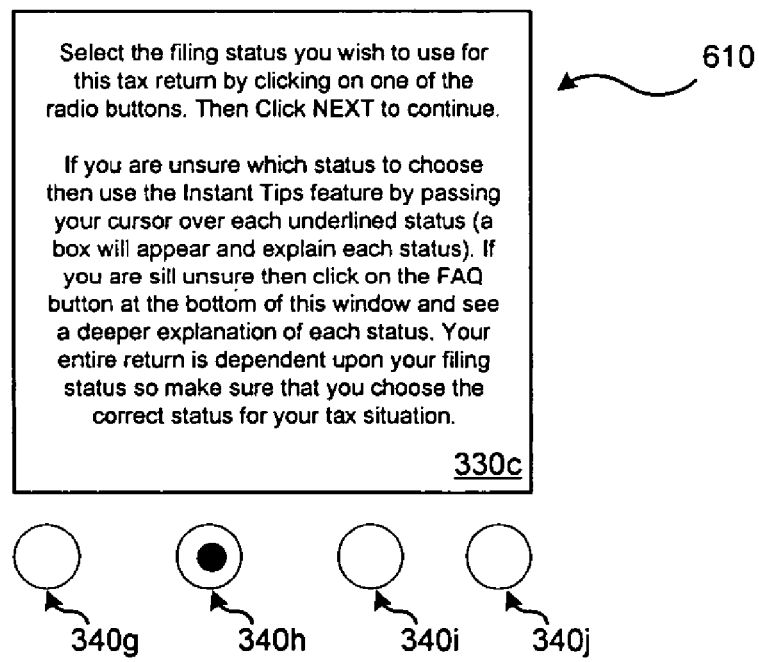
FIG. 6 is a schematic view of a second portion of the GUI according to an embodiment of the invention.

In an embodiment, and as illustrated in FIG. 6, the user may elect to display in the pane 330c instructions 610 pertaining to the type of information solicited by the question displayed in pane 330a. Display of the instructions 610 may be prompted by the user's selection of button 340h, for example. In the example illustrated in FIG. 6, the instructions 610 provide to the user guidance in answering the filing-status question displayed in pane 330a (FIG. 3). While in this mode (i.e., while button 340h is selected), the pane 330c will display the instructions 610 updated in a manner corresponding to the interview-question section displayed in pane 330a.

In an embodiment, the user may elect to perform operations including displaying in the panes 330a-330c, or one or more web pages (not shown) provided to the client device 210 by the server 230, additional information to aid the user in inputting the required tax data. For example, by selecting one or more of the buttons 340i, 340j, the user may be able to prompt a "Help Center" display (not shown) allowing the user to access, via the server 230, a real-time online discussion with a tax expert. Additionally or alternatively, by selecting one or more of the buttons 340i, 340j, the user may be able to prompt a "Navigator" display (not shown) that provides a list of selectable entries corresponding to the sections of the question series. Accordingly, by selecting one of these entries, the user may transition directly to display in the pane 330a of one or more specific questions in the series. Additionally or alternatively, by selecting one or more of the buttons 340i, 340j, the user may be able to prompt a "Bookmark" display (not shown) that allows the user to mark a question and/or select a previously marked question for later return. Additionally or alternatively, by selecting one or more of the buttons 340i, 340j, the user may be able to prompt a "Summary" display (not shown) that provides a summary of the entered tax data and the impact this entered data has on tax amounts owed by and tax refund due the user.

Figure 7:
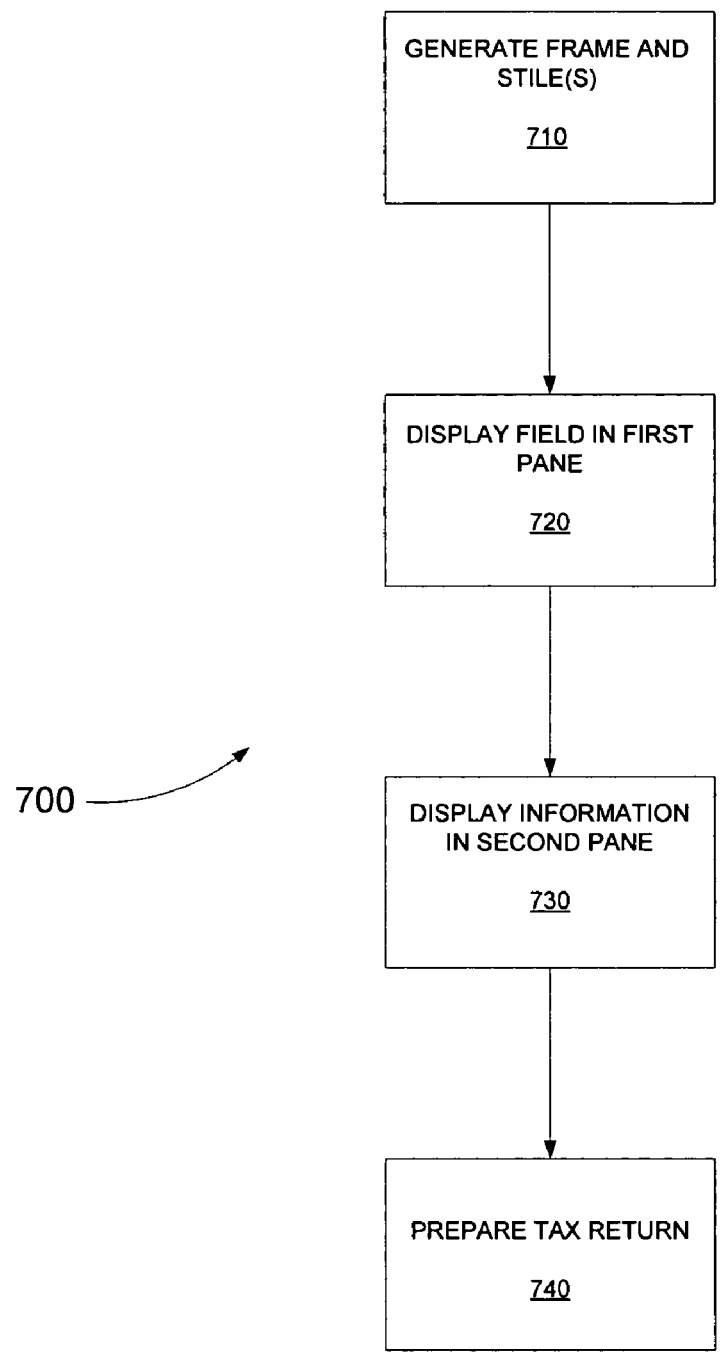
FIG. 7 is a flow diagram illustrating a first method according to an embodiment of the invention.

FIG. 7 illustrates a process 700 according to an embodiment of the invention. The process 700 is illustrated as a set of operations shown as discrete blocks. The process 700 may be implemented in any suitable hardware, software, firmware, or combination thereof. The order in which the operations are described is not to be necessarily construed as a limitation.

At a block 710, a frame and at least one stile defining a plurality of panes within the frame is generated in a user interface. For example, the server 230 may generate such a user interface within a web page served by the server to the client device 210.

At a block 720, at least one field into which a tax-data provider can input tax data is displayed in a first one of the panes. For example, one or more radio buttons 360 and/or one or more data-entry fields 410 may be displayed in pane 330a.

At a block 730, information of a first type of a plurality of information types operable to assist the provider in performing a first operation of a set of operations using the user interface is displayed in a second one of the panes. For example, the status indicator 370 (which may characterize a quantity of the tax data to be input by the provider), the textual description 420 (which may characterize at least one type of the tax data to be input by the provider), the textual description 510 (which may characterize a tax-refund amount), or other information, as discussed above, may be displayed in pane 330b, for example. Additionally, the FAQs 380 and corresponding information, the instructions 610, or other information, as discussed above, may be displayed in pane 330c, for example.

At a block 740, a tax return is prepared using the input tax data. For example, the client device 210 may provide the input tax data to the server 230. Upon receiving the tax data, the server 230 may be operable to prepare and electronically file a tax return based on the tax data. Alternatively, the server 230 may provide the tax data to the computer system 260 by which, in turn, a tax return based on the tax data is prepared and electronically filed.

Figure 8:
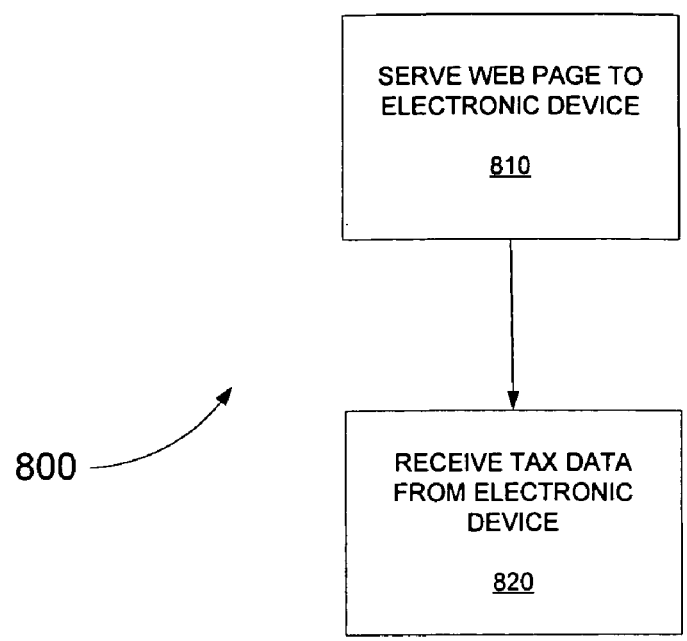
FIG. 8 is a flow diagram illustrating a second method according to an embodiment of the invention.

FIG. 8 illustrates a process 800 according to an embodiment of the invention. The process is implementable in an electronic system coupled to an electronic device, the electronic device being coupled to a display device. The process 800 is illustrated as a set of operations shown as discrete blocks. The process 800 may be implemented in any suitable hardware, software, firmware, or combination thereof. The order in which the operations are described is not to be necessarily construed as a limitation.

At a block 810, a web page displayable on the display device is served to the electronic device. In an embodiment, the web page is served to the electronic device through a network. The displayed web page includes a user interface having a frame and at least one stile defining a plurality of panes within the frame. At least one field into which a tax-data provider can input tax data is displayed in a first one of the panes. Information of a first type of a plurality of information types operable to assist the provider in performing a first operation of a set of operations using the user interface is displayed in a second one of the panes.

In an embodiment, the display device includes a display characteristic such as, for example, screen resolution. The electronic system may be operable to configure display of the user interface in accordance with the display characteristic. For example, the electronic system may, employ a suitable script code to determine the screen resolution. Upon determining the resolution, the electronic system may adjust the size and/or appearance of the user interface to correspond in a predetermined manner to the determined screen resolution to enhance the viewability of the user interface. Additionally, the user interface may be displayed within a window having a display area adjustable by the data provider. As such, the electronic system may adjust the size and/or appearance of the user interface to correspond in a predetermined manner to adjustments made to the display area of the window.

At a block 820, the input tax data is received by the electronic system from the electronic device. In an embodiment, the electronic system subsequently prepares a tax return using the received input tax data.

Figure 9:
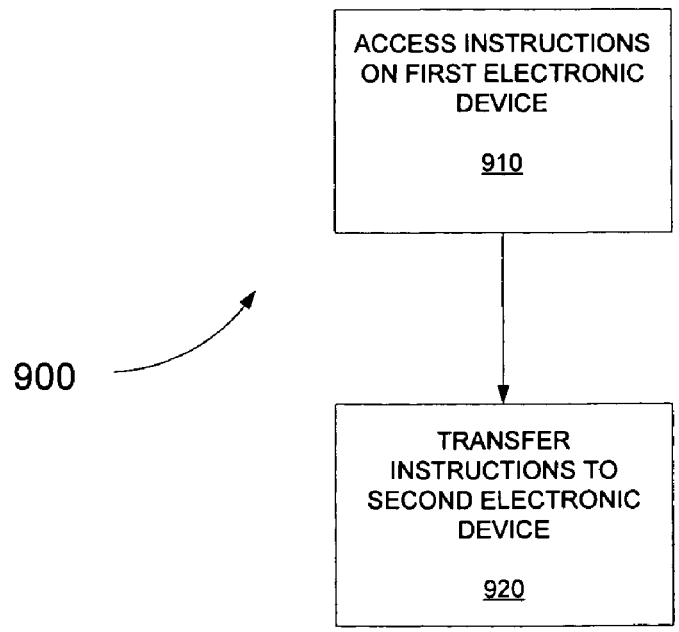
FIG. 9 is a flow diagram illustrating a third method according to an embodiment of the invention.

FIG. 9 illustrates a process 900 according to an embodiment of the invention. The process 900 is illustrated as a set of operations shown as discrete blocks. The process 900 may be implemented in any suitable hardware, software, firmware, or combination thereof. The order in which the operations are described is not to be necessarily construed as a limitation.

At a block 910, computer-executable instructions are accessed on at least one first electronic device. When executed on a data-processing system, the instructions generate in a user interface a frame and at least one stile defining a plurality of panes within the frame. The executed instructions display in a first one of the panes at least one field into which a tax-data provider can input tax data. Additionally, the executed instructions display in a second one of the panes information of a first type of a plurality of information types operable to assist the provider in performing a first operation of a set of operations using the user interface. Additionally, the executed instructions may prepare a tax return using the input tax data.

At a block 920, a set of the computer-executable instructions is transferred from the at least one first electronic device to at least one second electronic device through a communications medium, such as a network.

While a preferred embodiment of the invention has been illustrated and described, as noted above, many changes can be made without departing from the spirit and scope of the invention. For example, while the user interface provided by the web page 300 has been primarily described herein as being served by the server 230 to the client device 210, all of the features and functions of such user interface could be implemented in an application executed completely or partially by the client device 210. Consequently, a tax return incorporating tax data, including data entered by the user via such user interface, may be prepared and filed by the client device 210. Accordingly, the scope of the invention is not limited by the disclosure of the preferred embodiment. In one embodiment, a business method comprises providing one or more of the features and/or functions described above to users free of charge over the Internet. In another embodiment, the use of the system is provided for preparation of federal tax returns free of charge, and charges are only implied for non-federal (e.g. state returns). Alternatively, use for federal returns is charged, and for others is free of charge. Instead, the invention should be determined entirely by reference to the claims that follow.

The embodiments of the invention in which an exclusive property or privilege is claimed are defined as follows:

1. A non-transitory computer-readable medium having computer-executable instructions for performing steps comprising:
    generating in a user interface a frame and at least one stile defining a plurality of panes within the frame;
    displaying in a first one of the panes at least one field configured to receive tax data, the tax data comprising a response to a specific solicitation for tax-related information posted in the first one of the panes, the response selected from a set containing both correct and incorrect responses displayed within at least one of the panes, the response being input by a user who is a tax-data provider;
    displaying in a second one of the panes user-selectable information for assisting the user in determining a correct response from the set of correct and incorrect responses posted in said at least one of the panes,
    wherein the first one and second one of the panes are displayed in the user interface at the same time upon activation of the user interface;
    providing for the user to select the user-selectable information in the second one of the panes for assisting the user in determining a correct response;
    receiving information indicative of a selection by the user of information in the second one of the panes for assisting the user in determining the correct response;
    displaying in the user interface information for assisting the user in determining the correct response,
    wherein during said display of information, said at least one field configured to receive tax data in the first one of the panes remains selectable by and fully visible to the user,
    wherein the display of the information for assisting the user in determining the correct response does not launch another user interface;
    receiving the response input by the user; and
    preparing a tax return using the input response.

2. The medium of claim 1 having further computer-executable instructions for performing the step of displaying in a third one of said panes information of a second type of the plurality of information types operable to assist the provider in performing a first operation of a set of operations using the user interface.

3. The medium of claim 1 wherein the first-type information is operable to characterize at least one type of the tax data to be input by the provider.

4. The medium of claim 1 wherein the first-type information is operable to characterize a quantity of the tax data to be input by the provider.

5. The medium of claim 1 wherein the first-type information is operable to characterize a tax-refund amount.

6. The medium of claim 1 having further computer-executable instructions for performing the step of generating in the user interface at least one item selectable by the provider, wherein selection of the at least one item causes a type, different from the first type, of the plurality of information types to be displayed in the second one of the panes.

7. The medium of claim 2 wherein the second-type information comprises at least one selectable frequently asked question (FAQ) corresponding to an operation of the set of operations.

8. The medium of claim 2 wherein the FAQ comprises a hyperlink to informational data.

9. The medium of claim 8 wherein:
the user interface is generated by a first electronic device; and
the informational data is stored on a second client device coupled to the first electronic device through a network.

10. The medium of claim 2 having further computer-executable instructions for performing the step of generating in the user interface at least one item selectable by the provider, wherein selection of the at least one item causes a type, different from the second type, of the plurality of information types to be displayed in the third one of the panes.

11. The medium of claim 1 having further computer-executable instructions for performing the step of generating in the user interface at least one item selectable by the provider, wherein selection of the at least one item causes an operation of the set of operations to be performed.

12. A method implementable in an electronic system coupled to an electronic device, the electronic device being coupled to a display device, the method comprising:
(a) serving to the electronic device a web page displayable on the display device, the displayed web page including a user interface comprising a frame and at least one stile defining a plurality of panes within the frame, wherein:
(1) in a first one of the panes, at least one field configured to receive tax data, the tax data comprising a response to a specific solicitation for tax-related information posted in the first one of the panes, the response selected from a set containing both correct and incorrect responses displayed within at least one of the panes, the response being input by a user who is a tax-data provider, is displayed; and
(2) in a second one of the panes, user-selectable information for assisting the user in determining a correct response from the set of correct and incorrect responses posted in at least one of the panes is displayed;
wherein the first one and second one of the panes are displayed in the user interface at the same time upon activation of the user interface;
providing for the user to select the user-selectable information in the second one of the panes for assisting the user in determining a correct response;
receiving information indicative of a selection by the user of information in the second one of the panes for assisting the user in determining the correct response;
displaying in the user interface information for assisting the user in determining the correct response,
wherein during said display of information, said at least one field configured to receive tax data in the first one of the panes remains selectable by and fully visible to the user,
wherein the display of the information for assisting the user in determining the correct response does not launch another user interface; and
(b) receiving the response input by the user from the electronic device.

13. The method of claim 12, further comprising preparing a tax return using the received input tax data.

14. The method of claim 12 wherein the web page is served to the electronic device through a network.

15. The method of claim 12 wherein:
the display device includes a display characteristic; and
the method further comprises configuring display of the user interface in accordance with the display characteristic.

16. The method of claim 15, further comprising automatically detecting the display characteristic.

17. The method of claim 12 wherein:
the user interface is displayed within a window displayable on the display device, the window having a display area adjustable by the provider; and
the method further comprises configuring display of the user interface in accordance with adjustment of the display area.

18. A method of transferring a computer program product from at least one first electronic device to at least one second electronic device connected to the at least one first electronic device through a communication medium, the method comprising the steps of:
(a) accessing, on the at least one first electronic device, computer-executable instructions that, when executed on a data-processing system, perform at least the steps of:
(1) generating in a user interface a frame and at least one stile defining a plurality of panes within the frame;
(2) displaying in a first one of the panes at least one field configured to receive tax data, the tax data comprising a response to a specific solicitation for tax-related information posted in the first one of the panes, the response selected from a set containing both correct and incorrect responses displayed within at least one of the panes, the response being input by a user who is a tax-data provider; and
(3) displaying in a second one of the panes user-selectable information for assisting the provider in determining a correct response from the set of correct and incorrect responses posted in at least one of the panes;
wherein the first one and second one of the panes are displayed in the user interface at the same time upon activation of the user interface;
providing for the user to select the user-selectable information in the second one of the panes for assisting the user in determining a correct response;
receiving information indicative of a selection by the user of information in the second one of the panes for assisting the user in determining the correct response;
displaying in the user interface information for assisting the user in determining the correct response,
wherein during said display of information, said at least one field configured to receive tax data in the first one of the panes remains selectable by and fully visible to the user,
wherein the display of the information for assisting the user in determining the correct response does not launch another user interface; and
(b) transferring a set of the computer-executable instructions from the at least one first electronic device to the at least one second electronic device through the communications medium.

19. The method of claim 18 wherein the computer-executable instructions further perform the step of preparing a tax return using the input tax data.

20. The method of claim 18 wherein the communications medium comprises a network.

21. A non-transitory computer-readable medium having computer-executable instructions for performing steps comprising:
  generating in a user interface a frame and at least one stile defining a plurality of panes within the frame;
  displaying in a first one of the panes at least one field configured to receive tax data from a tax-data provider;
  displaying in a second one of the panes at least one user-selectable hyperlink to information for assisting the user in performing a first operation of a set of operations posted in at least one of the panes using the user interface;
  wherein the first one and second one of the panes are displayed in the user interface at the same time upon activation of the user interface;
  providing for the user to select the user-selectable hyperlink in the second one of the panes for assisting the user in performing a first operation;
  receiving information indicative of a selection by the user of a hyperlink in the second one of the panes for assisting the user in performing a first operation;
  upon receiving from the provider a selection of the hyperlink, displaying a third pane and a web page in the third pane comprising the information;
  wherein during said display of said web page, said at least one field configured to receive tax data in the first one of the panes remains selectable by and fully visible to the user,
  wherein the display of the web page comprising the information for assisting the user in determining the correct response does not launch another user interface; and
  preparing a tax return using the input tax data.

* * * * *